United States Patent
Tasher

(10) Patent No.: US 10,757,087 B2
(45) Date of Patent: Aug. 25, 2020

(54) SECURE CLIENT AUTHENTICATION BASED ON CONDITIONAL PROVISIONING OF CODE SIGNATURE

(71) Applicant: Winbond Electronics Corporation, Taichung (TW)

(72) Inventor: Nir Tasher, Herzliya (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 151 days.

(21) Appl. No.: 15/859,780

(22) Filed: Jan. 2, 2018

(65) Prior Publication Data
US 2019/0207917 A1 Jul. 4, 2019

(51) Int. Cl.
| | |
|---|---|
| H04L 29/06 | (2006.01) |
| G06F 21/57 | (2013.01) |
| G06F 21/64 | (2013.01) |
| G06F 3/06 | (2006.01) |
| G06F 12/14 | (2006.01) |
| H04L 9/32 | (2006.01) |

(52) U.S. Cl.
CPC .............. *H04L 63/08* (2013.01); *G06F 3/065* (2013.01); *G06F 3/0619* (2013.01); *G06F 3/0679* (2013.01); *G06F 12/1441* (2013.01); *G06F 21/575* (2013.01); *G06F 21/64* (2013.01); *G06F 2212/1052* (2013.01); *H04L 9/3239* (2013.01)

(58) Field of Classification Search
CPC ..... H04L 63/08; H04L 9/3239; G06F 3/0619; G06F 3/065; G06F 3/0679; G06F 12/1441; G06F 21/575; G06F 21/64; G06F 2212/1052
See application file for complete search history.

(56) References Cited

U.S. PATENT DOCUMENTS

| | | | |
|---|---|---|---|
| 6,651,171 B1* | 11/2003 | England | G06F 12/1491 711/163 |
| 9,361,244 B2 | 6/2016 | Hiremane et al. | |
| 9,680,872 B1* | 6/2017 | Roth | H04L 63/20 |

(Continued)

FOREIGN PATENT DOCUMENTS

| | | |
|---|---|---|
| CN | 1517888 A | 8/2004 |
| CN | 102521101 A | 6/2012 |

(Continued)

OTHER PUBLICATIONS

TCG., "Trusted Platform Architecture Hardware Requirements for a Device Identifier Composition Engine", Committee Draft, Family 2.0, Level 00, Revision 69, 11 pages, Dec. 16, 2016.

(Continued)

*Primary Examiner* — Kristine L Kincaid
*Assistant Examiner* — Zoha Piyadehghibi Tafaghodi
(74) *Attorney, Agent, or Firm* — Kligler & Associates Patent Attorneys Ltd

(57) ABSTRACT

A memory subsystem includes a memory interface for accessing a non-volatile memory (NVM), a host interface for communicating with a host, and a processor. The processor is configured to calculate a signature over program code that is used by the host and is stored in the NVM, to verify, upon detecting a boot process performed by the host, whether the boot process is legitimate, and, only if the boot process was verified to be legitimate, to provide the signature to the host for authentication to a remote server.

9 Claims, 2 Drawing Sheets

(56) References Cited

U.S. PATENT DOCUMENTS

| | | | |
|---|---|---|---|
| 2003/0200454 A1 | 10/2003 | Foster et al. | |
| 2009/0222653 A1 | 9/2009 | Findeisen et al. | |
| 2012/0030354 A1* | 2/2012 | Razzaq | G06F 21/335 |
| | | | 709/225 |
| 2014/0281500 A1 | 9/2014 | Ignatchenko | |
| 2014/0359239 A1* | 12/2014 | Hiremane | G06F 21/575 |
| | | | 711/163 |
| 2016/0219029 A1* | 7/2016 | Oshida | H04L 67/1095 |
| 2017/0076081 A1* | 3/2017 | Raskin | G06F 21/34 |

FOREIGN PATENT DOCUMENTS

| | | |
|---|---|---|
| CN | 104636256 A | 5/2015 |
| JP | 2009175923 A | 8/2009 |
| TW | I531202 B | 4/2016 |

OTHER PUBLICATIONS

JP Application # 2018217068 office action dated Aug. 20, 2019.
TW Application # 10820738490 office action dated Aug. 5, 2019.

\* cited by examiner

SECURE CLIENT AUTHENTICATION BASED ON CONDITIONAL PROVISIONING OF CODE SIGNATURE

FIELD OF THE INVENTION

The present invention relates generally to secure communication and data storage, and particularly to methods and systems for authentication of secure client devices.

BACKGROUND OF THE INVENTION

A secure client communicating with a server is sometimes required to authenticate itself to the server, and to prove that it has not been compromised by a hostile third party. Various solutions have been proposed for this sort of authentication process. Some solutions involve creating and reporting to the server a secure identity of the client. For example, the Trusted Computing Group (TCG) specifies a solution called "Device Identifier Composition Engine" (DICE), in "Trusted Platform Architecture Hardware Requirements for a Device Identifier Composition Engine," Family 2.0, Level 00, Revision 69, Dec. 16, 2016, which is incorporated herein by reference.

SUMMARY OF THE INVENTION

An embodiment of the present invention that is described herein provides a memory subsystem including a memory interface for accessing a non-volatile memory (NVM), a host interface for communicating with a host, and a processor. The processor is configured to calculate a signature over program code that is used by the host and is stored in the NVM, to verify, upon detecting a boot process performed by the host, whether the boot process is legitimate, and, only if the boot process was verified to be legitimate, to provide the signature to the host for authentication to a remote server.

In some embodiments, the processor is configured to store the signature in a volatile register, and to clear the volatile register in response to detecting that the boot process is not legitimate. In some embodiments, the processor is configured to verify whether the boot process is legitimate by verifying whether one or more first accesses of the host to the NVM are addressed to a range of memory addresses predefined as legitimate. In an embodiment, when the boot process is verified to be legitimate, the processor is configured to modify the range of memory addresses predefined as legitimate.

There is additionally provided, in accordance with an embodiment of the present invention, a secure client device including a non-volatile memory (NVM), a host and a memory subsystem. The memory subsystem is configured to access the NVM for the host, to calculate a signature over program code that is used by the host and is stored in the NVM, to verify, upon detecting a boot process performed by the host, whether the boot process is legitimate, and, only if the boot process was verified to be legitimate, to provide the signature to the host for authentication to a remote server.

There is further provided, in accordance with an embodiment of the present invention, a method including calculating a signature over program code that is used by a host and is stored in a non-volatile memory (NVM). Upon detecting a boot process performed by the host, a verification is made whether the boot process is legitimate. The signature is provided to the host, for authentication to a remote server, only if the boot process was verified to be legitimate.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for authentication of secure client devices vis-à-vis remote servers. In the disclosed embodiments, a secure client device comprises a Non-Volatile Memory (NVM), a host, and a memory subsystem that accesses the NVM on behalf of the host. As part of an authentication process between the secure client device and a server, the host is required to provide the server with a signature calculated over some or all of the program code (software code) of the host, which is stored in the NVM.

A possible security vulnerability of such a process is that a hostile third party may gain access to the correct signature. The third party may authenticate itself to the server using the correct signature, but then communicate with the server using rogue program code. In some embodiments, the memory subsystem of the secure client device eliminates this and other vulnerabilities, by providing the signature to the host only upon verifying that the boot process of the secure client device is legitimate.

In an example embodiment, the memory subsystem calculates the signature over the program code, and stores the signature in a volatile register. This preparatory step can be performed at any suitable time before the secure client device boots. At a later point in time, the memory subsystem detects the beginning of the boot process of the secure client device. For example, the memory subsystem may detect the (one or more) first read commands issued from the host to the NVM. The memory subsystem verifies whether the boot process is legitimate or not, e.g., by checking whether the first read commands are addressed to memory addresses known to contain legitimate boot code. If the boot process appears to be illegitimate, the memory subsystem erases the content of the volatile register holding the signature.

When the memory subsystem operates in the above-described manner, only a host that performs the legitimate boot process will be able to provide the correct signature to the server. A rogue host, characterized by an illegitimate boot process, will not receive the correct signature from the memory subsystem and will not be able to authenticate itself to the server.

In some embodiments, once a legitimate code boots from the range of addresses that was predefined as legitimate, the code is permitted to modify (e.g., expand) this address range. This feature allows legitimate code to continue executing from a larger address range without causing erasure of the signature.

The disclosed techniques are typically implemented in hardware within the memory subsystem, and are transparent to the host. The techniques described herein are simple to implement, but at the same time provide a high degree of security. The disclosed techniques can be embedded in various authentication frameworks, e.g., in the TCG DICE framework.

System Description

Figure 1:
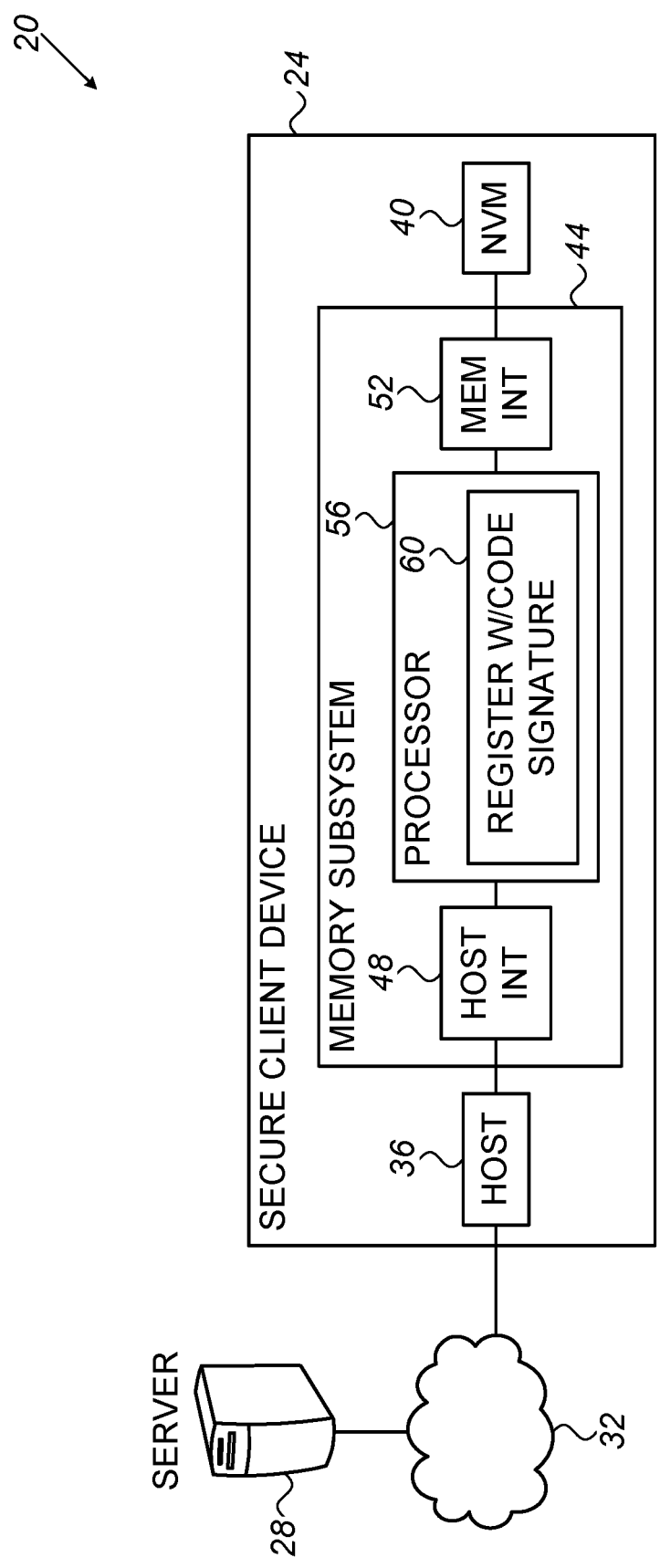
FIG. 1 is a block diagram that schematically illustrates a secure client device communicating with a remote server, in accordance with an embodiment of the present invention.

FIG. 1 is a block diagram that schematically illustrates a system 20 in which a secure client device 24 communicates with a remote server 28 over a communication network 32, in accordance with an embodiment of the present invention. Secure client device 24 and remote server 28 are referred to herein simply as "client" and "server" for brevity.

In one example embodiment, client 24 is part of an Internet-of-Things (IoT) terminal and server 28 comprises an IoT application server. In another example embodiment, client 24 is part of an automotive subsystem in a vehicle, and server 28 comprise a central computer of the vehicle. Further alternatively, client 24 and server 28 may comprise any other suitable computing platforms used for any other suitable application. Network 32 may comprise any suitable communication network, e.g., a Local-Area Network (LAN), a Wide-Area Network (WAN) such as the Internet, a cellular network, or a combination of two or more networks.

In the example of FIG. 1, client 24 comprises a host processor 36 (referred to simply as "host"), a Non-Volatile Memory (NVM) 40 and a memory subsystem 44. Host 36 may comprise any suitable processor. In the present example, NVM 40 comprises a Flash memory, but any other suitable type of NVM can be used in alternative embodiments. NVM 40 is used for storing various kinds of data, including the program code (software code) that host 36 runs. Memory subsystem 44 accesses NVM 40 on behalf of host 36. For example, memory subsystem 44 receives read and write commands issued by host 36, and executes the commands in NVM 40.

In the embodiment of FIG. 1, memory subsystem 44 comprises a host interface 48 for communicating with host 36, a memory interface for communicating with NVM 40, and a processor 56 that is configured to perform the various tasks of the memory subsystem. Among other tasks, processor 56 calculates a secure signature over the program code stored in NVM 40 and stores the signature in a volatile register 60. Processor 56 also identifies whenever host 36 begins its boot process from NVM 40, verifies whether the boot process is legitimate, and, if not, deletes the content of register 60. This security mechanism is described in detail below.

The configurations of system 20 and client 24 shown in FIG. 1 are example configurations that are depicted purely for the sake of conceptual clarity. In alternative embodiments, any other suitable configurations can be used. In one embodiment, memory subsystem 44 and NVM 40 are fabricated in a single System-on-Chip (SoC), e.g., in respective semiconductor dies packaged in the same device package. In another embodiment, memory subsystem 44 and NVM 40 are fabricated as separate devices. Elements that are not mandatory for understanding of the disclosed techniques have been omitted from the figure for the sake of clarity.

In various embodiments, the different elements of client 24 shown in FIG. 1 may be implemented using any suitable hardware, such as in an Application-Specific Integrated Circuit (ASIC) or Field-Programmable Gate Array (FPGA). Alternatively, some of the functions of client 24, e.g., the functions of host 36 and/or of processor 56, may be implemented in software, or using a combination of software and hardware elements.

Typically, host 36 and processor 56 comprise general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Conditional Provisioning of Program-Code Signature by Memory Subsystem

In some embodiments, client 24 is required to authenticate itself to server 28 and prove its security has not been compromised. In an example authentication process, client 24 calculates a signature over at least part of the program code of host 36, as stored in NVM 40. Client 24 uses the signature value for authenticating itself to the server. The server typically compares the signature provided by the client with an expected value of the signature. The client may calculate the signature, for example, by applying a one-way cryptographic operation to the program code. A typical example of a one-way cryptographic operation is a hashing function such as SHA.

In some embodiments, memory subsystem 44 carries out an additional security mechanism, which ensures that the signature is provided only to the original code and not to any rogue code. In these embodiments, processor 56 of memory subsystem 44 saves the signature in volatile register 60. Upon detecting that host 36 begins its boot process, processor 56 verifies whether the boot process is legitimate. If processor 56 suspects that the boot process is illegitimate (meaning that host 36 is likely to have been compromised), the processor clears the content of register 60, thereby erasing the signature. As such, only program code that performs a legitimate boot process will be able to obtain (and authenticate to the server using) the true signature value.

Figure 2:
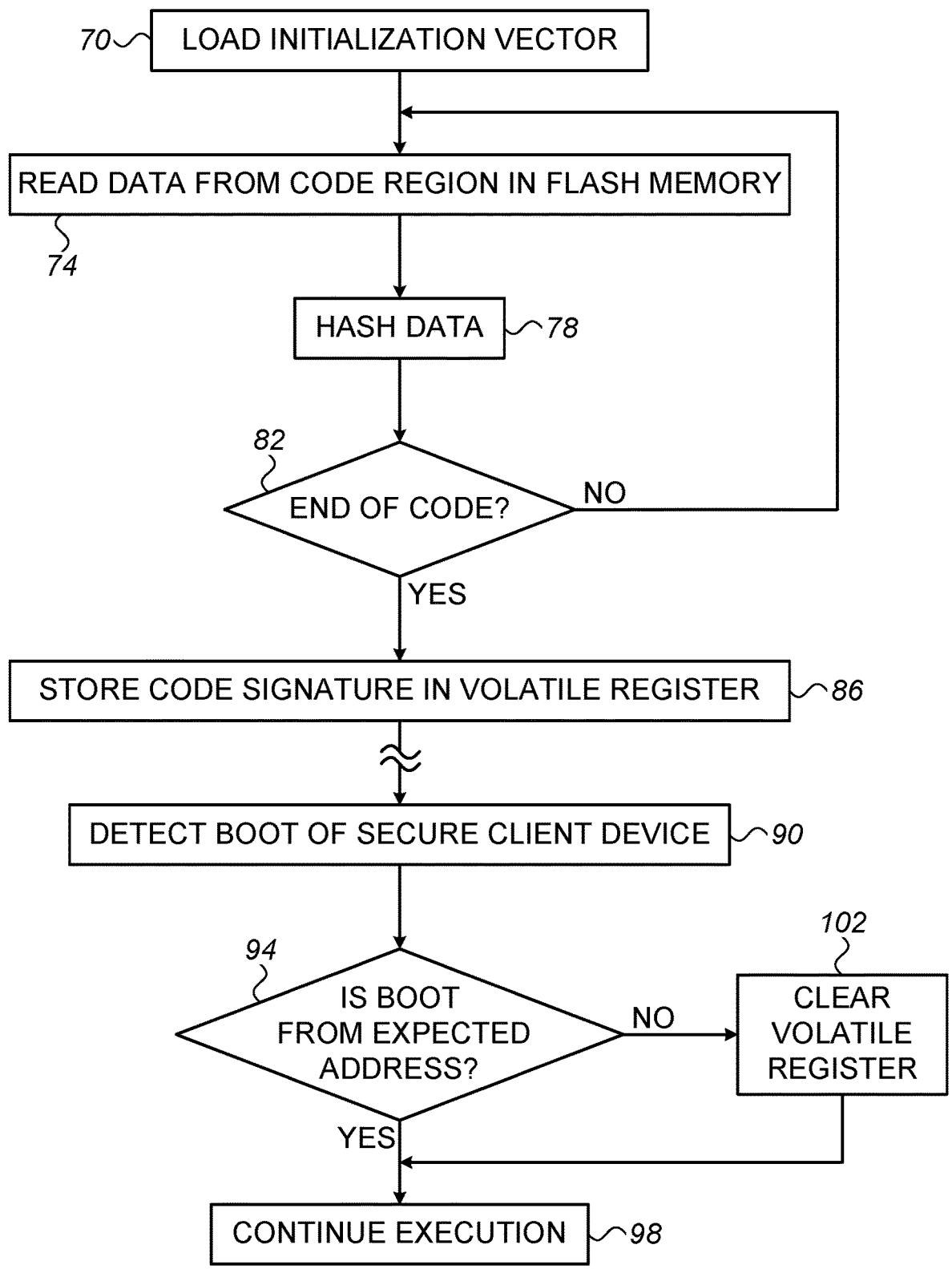
FIG. 2 is a flow chart that schematically illustrates a method for conditional provisioning of code signature, in accordance with an embodiment of the present invention.

FIG. 2 is a flow chart that schematically illustrates a method for conditional provisioning of the code signature, carried out by processor 56 of memory subsystem 44, in accordance with an embodiment of the present invention. In the first stage of the method (steps 70-86), processor 56 calculates and saves the code signature. This stage can be performed at any suitable time before client 24 is booted, for example before every boot and/or following software upgrade. In the second stage of the method (step 90-102), processor 56 makes the signature available only to the legitimate program code.

The method begins with processor 56 loading an initialization vector (key) for calculating the code signature, at a key loading step 70. At a data readout step 74, processor 56 reads the next data chunk (e.g., word or page) from the region of NVM 40 used for storing the program code of host 36.

At a hashing step 78, processor 56 hashes the data chunk. The hashing operation is incremental, i.e., each iteration of step 78 provides a cumulative signature of the recently-loaded data chunk and all previous data chunks.

At a termination checking step 82, processor 56 checks whether all the required program code (the code over which the signature is defined) has been hashed. If not, the method loops back to step 74 above for reading the next chunk of program code from NVM 40. After the entire program code has been hashed, processor 56 saves the resulting signature in volatile register 60, at a signature storage step 86.

At some later point in time, processor 56 detects that host 36 begins to perform a boot process, at a boot detection step 90. For example, processor 56 may detect the (one or more) first read commands issued by host 36 to NVM 40 following power-up.

At a boot verification step 94, processor 56 checks whether the detected boot process is legitimate or not. In one embodiment, processor 56 is aware of the memory addresses in which the genuine boot code of host 36 is stored. Upon detecting the first read commands issued by host 36 following power-up, processor 56 assumes that these read commands should be addressed to these addresses.

If the first read commands are indeed addressed to the expected memory addresses, processor 56 concludes that the boot process is legitimate, and continues execution, at a normal execution step 98. In particular, if host 36 will subsequently request the code signature from memory subsystem 40, processor 56 will return the true signature value stored in register 60.

If, on the other hand, the first read commands are not addressed to the expected memory addresses, processor 56 concludes that the boot process has been compromised by some hostile party. In response, processor 56 clears the content of register 60, at a signature erasure step 102, before reverting to normal execution step 98. In such a case, host 36 is unable to retrieve the code signature. As a result, the illegitimate code will not be able to complete the authentication process with server 28.

The method flow of FIG. 2 is an example flow, which is depicted purely for the sake of conceptual clarity. Any other suitable flow can be used for implementing the disclosed techniques in alternative embodiments. For example, processor 56 may use other criteria for verifying whether the boot process of host 36 is legitimate or not, not necessarily relating to the memory addresses being read.

As another example, as noted above, once processor 56 completes a legitimate boot process, the processor may modify the range of addresses that is considered legitimate for code readout. In this manner, processor 56 may continue executing legitimate code from a larger address range without causing erasure of the signature in register 60.

In some embodiments, at least the functions of processor 56 that verify the boot process and clear register 60 are implemented using dedicated hardware logic in the memory subsystem, making them difficult to circumvent.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A memory subsystem, comprising:
   a memory interface for accessing a non-volatile memory (NVM);
   a host interface for communicating with a host; and
   a microprocessor, configured to:
   calculate a signature over program code that is used by the host and is stored in the NVM;
   upon detecting a power-up of the host, verify whether first read commands issued by the host following the power-up are directed to addresses in accordance with predefined addresses expected for a genuine boot code; and
   only if the first read commands were verified to be directed to addresses of the genuine boot code, provide the signature to the host for authentication to a remote server.

2. The memory subsystem according to claim 1, wherein the processor is configured to store the signature in a volatile register, and to clear the volatile register in response to detecting a read command addressed to an address outside a range of the genuine boot code.

3. The memory subsystem according to claim 1, wherein the processor is further configured to verify that memory accesses after the first read commands issued by the host following the power-up are directed to a range of memory addresses considered legitimate for after boot access, wherein the range of memory addresses considered legitimate for after boot access is larger than a range including the predefined addresses expected for a genuine boot code.

4. A secure client device, comprising:
   a non-volatile memory (NVM);
   a host; and
   a memory subsystem, configured to:
   access the NVM for the host;
   calculate a signature over program code that is used by the host and is stored in the NVM;
   upon detecting a power-up of the host, verify whether first read commands issued by the host following the power-up are directed to addresses in accordance with predefined addresses expected for a genuine boot code; and
   only if the first read commands were verified to be directed to addresses of the genuine boot code, provide the signature to the host for authentication to a remote server.

5. The secure client device according to claim 4, wherein the memory subsystem is configured to store the signature in a volatile register, and to clear the volatile register in response to detecting a read command addressed to an address outside a range of the genuine boot code.

6. The secure client device according to claim 4, wherein the memory subsystem is further configured to verify that memory accesses after the first read commands issued by the host following the power-up are directed to a range of memory addresses considered legitimate for after boot access, wherein the range of memory addresses considered legitimate for after boot access is larger than a range including the predefined addresses expected for a genuine boot code.

7. A method, comprising:
   calculating a signature over program code that is used by a host and is stored in a non-volatile memory (NVM);
   upon detecting a power-up of the host, verifying whether first read commands issued by the host following the power-up are directed to addresses in accordance with predefined addresses expected for a genuine boot code; and only if the first read commands were verified to be directed to addresses of the genuine boot code, providing the signature to the host for authentication to a remote server.

8. The method according to claim 7, and comprising storing the signature in a volatile register, and clearing the volatile register in response to detecting a read command addressed to an address outside a range of the genuine boot code.

9. The method according to claim 7, and comprising verifying that memory accesses after the first read commands issued by the host following the power-up are directed to a range of memory addresses considered legitimate for after boot access, wherein the range of memory addresses considered legitimate for after boot access is larger than a range including the predefined addresses expected for a genuine boot code.

* * * * *